(12) United States Patent
Jin et al.

(10) Patent No.: US 11,534,936 B2
(45) Date of Patent: Dec. 27, 2022

(54) METHOD OF FORMING COOLING CHANNELS IN A CERAMIC MATRIX COMPOSITE COMPONENT

(71) Applicant: United Technologies Corporation, Farmington, CT (US)

(72) Inventors: Lei Jin, Unionville, CT (US); Zachary P. Konopaske, Hartford, CT (US); Ryan M. Brodeur, Southwick, MA (US); Howard J. Liles, Newington, CT (US); Bryan H. Farrar, West Hartford, CT (US); Andrew J. Lazur, Laguna Beach, CA (US)

(73) Assignee: Raytheon Technologies Corporation, Farmington, CT (US)

( * ) Notice: Subject to any disclaimer, the term of this patent is extended or adjusted under 35 U.S.C. 154(b) by 105 days.

(21) Appl. No.: 16/503,905

(22) Filed: Jul. 5, 2019

(65) Prior Publication Data

US 2021/0001511 A1 Jan. 7, 2021

(51) Int. Cl.
*B28B 1/093* (2006.01)
*B28B 1/00* (2006.01)
*B28B 11/08* (2006.01)
*C04B 35/14* (2006.01)

(52) U.S. Cl.
CPC ............ *B28B 1/0935* (2013.01); *B28B 1/002* (2013.01); *B28B 11/0863* (2013.01); *C04B 35/14* (2013.01); *C04B 2235/6028* (2013.01); *C04B 2235/945* (2013.01)

(58) Field of Classification Search
CPC ... B28B 1/0935; B28B 1/002; B28B 11/0863; C04B 2235/6028; C04B 2235/945; F01D 5/181; F05D 2300/6033; F05D 2300/6034
See application file for complete search history.

(56) References Cited

U.S. PATENT DOCUMENTS

| 4,386,825 | A | * | 6/1983 | Stalcup | G02B 7/1815 359/845 |
| 4,410,394 | A | | 10/1983 | Stalcup et al. | |
| 5,196,271 | A | | 3/1993 | White et al. | |
| 5,302,265 | A | * | 4/1994 | Dalzell, Jr. | C25D 13/02 204/512 |
| 5,306,560 | A | * | 4/1994 | Wright | C04B 35/62852 428/379 |
| 6,627,019 | B2 | | 9/2003 | Jarmon et al. | |
| 7,243,700 | B2 | * | 7/2007 | Beals | B22D 29/002 134/2 |

(Continued)

FOREIGN PATENT DOCUMENTS

| EP | 1215183 A1 | 6/2002 |
| EP | 1635119 A2 | 3/2006 |
| EP | 3163027 A1 | 5/2017 |

OTHER PUBLICATIONS

Extended European Search Report for EP Application No. 20183962.8, dated Dec. 2, 2020, 8 pages.

*Primary Examiner* — Seyed Masoud Malekzadeh
(74) *Attorney, Agent, or Firm* — Kinney & Lange, P.A.

(57) ABSTRACT

A method of forming a ceramic matrix composite component with cooling channels includes embedding a plurality of wires into a preform structure, densifying the preform structure with embedded wires, and removing the plurality of wires to create a plurality of corresponding channels within the densified structure.

8 Claims, 2 Drawing Sheets

(56) References Cited

U.S. PATENT DOCUMENTS

| | | | |
|---|---|---|---|
| 7,464,554 B2* | 12/2008 | Cheung | F23R 3/00 |
| | | | 60/754 |
| 9,664,053 B2* | 5/2017 | Marshall | D03D 25/005 |
| 9,908,305 B2* | 3/2018 | Chamberlain | C04B 35/80 |
| 10,017,425 B2 | 7/2018 | Tuertscher et al. | |
| 2003/0173720 A1 | 9/2003 | Musso et al. | |
| 2015/0226071 A1* | 8/2015 | Marshall | F01D 5/282 |
| | | | 416/241 B |
| 2016/0115086 A1* | 4/2016 | Tuertscher | F01D 5/284 |
| | | | 264/29.1 |
| 2016/0348511 A1 | 12/2016 | Varney | |

* cited by examiner

METHOD OF FORMING COOLING CHANNELS IN A CERAMIC MATRIX COMPOSITE COMPONENT

BACKGROUND

The present invention relates to the fabrication of ceramic matrix composites and more particularly, to a ceramic matrix composite having improved properties for operating in gas turbine engines.

Ceramic matrix composite components, such as those formed of silicon carbide, are commonly used in high-temperature environments because they can withstand temperatures up to 2500° F. Such components can still benefit from additional cooling to prevent component degradation. One way to provide additional cooling is through the incorporation of cooling channels into the component. The structure of many ceramic matrix composite components can make adding such features, especially in-plane and curved channels, somewhat difficult when using traditional machining process.

SUMMARY

A method of forming a ceramic matrix composite component with cooling channels includes embedding a plurality of wires into a preform structure, densifying the preform structure with embedded wires, and removing the plurality of wires to create a plurality of corresponding channels within the densified structure.

A ceramic matrix composite component includes a wall having a thickness and a plurality of channels extending at least partially though the thickness of the wall. A diameter of at least one of the plurality of channels ranges from 0.010 in to 0.050 in, and one of the plurality of channels is spaced apart from an adjacent one of the plurality of channels by 0.010 in to 0.050 in.

Figure 1:
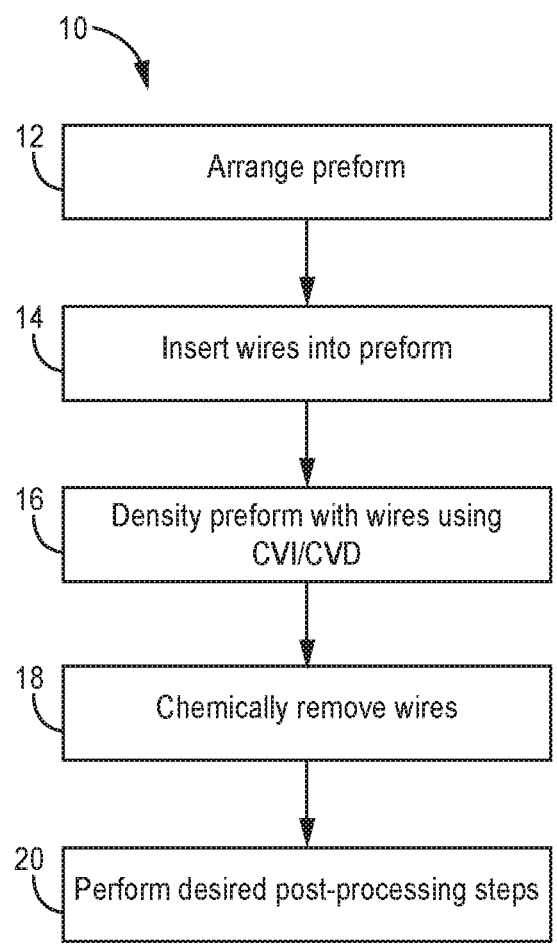
FIG. 1 is flowchart illustrating a method of forming a ceramic matrix composite component with cooling channels.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A method of forming a ceramic matrix composite (hereinafter "CMC") with cooling channels is disclosed herein. The method includes making a fiber preform made up of one or more fiber plies or other subcomponents. Wires are inserted/embedded into the preform structure at desired cooling channel locations. The preform with embedded wires can undergo a densification step during which a matrix is formed around the preform and wires. After densification, the CMC can undergo a chemical dissolution step to remove the wires from the structure and leave behind cooling channels where the wires had been.

Figure 2:
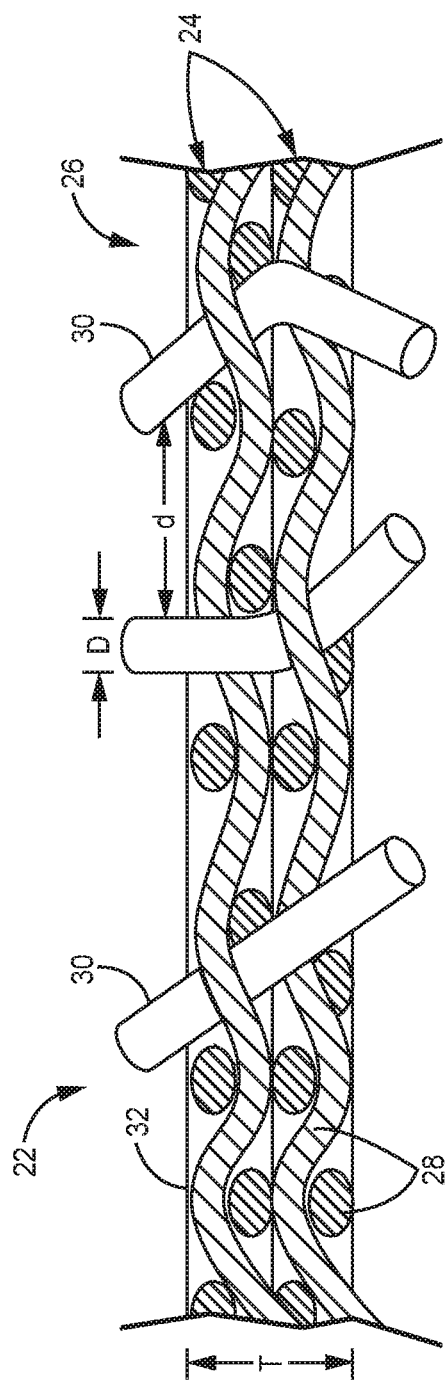
FIG. 2 is a simplified cross-sectional view of a preform structure of the ceramic matrix composite component, with embedded wires.
Figure 3:
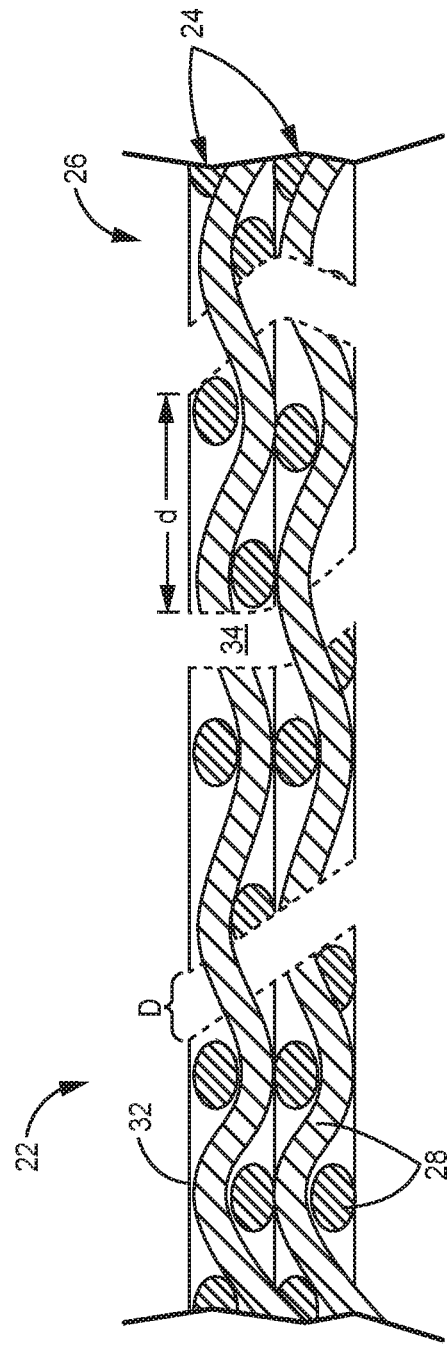
FIG. 3 is a simplified cross-sectional view of the ceramic matrix composite component after removal of the wires.

FIG. 1 is a flowchart illustrating selected steps 12-20 of method 10, used to form a high-temperature CMC component 22. FIGS. 2 and 3 are simplified cross-sectional views of a portion of the CMC component at various stages of method 10. Steps 12-20 are described below in combination with FIGS. 2 and 3.

At step 12, a plurality of fiber plies 24 are arranged in a desired manner, such as in a stacked arrangement, to create preform structure 26. Plies 24 can be formed from woven and/or non-woven ceramic fibers or tows 28, which in an exemplary embodiment, can be formed from silicon carbide. Other suitable ceramics are contemplated herein. Plies 24 can further be formed from unidirectional and/or multidirectional (including randomly oriented) fibers. In the embodiment shown in FIGS. 2 and 3, plies 24 are generally uniform in their design, however, alternative embodiments can include any combination of woven and/or non-woven plies 24, as well as any combination of fiber orientations. If desired, preform 26 can be given a two or three-dimensional shape by, for example, laying up plies 24 on a shaped tool, or by using a near-net-shape weaving technique.

At step 14, wires 30 can be inserted into preform 26. In an exemplary embodiment, wires 30 can be formed from pure molybdenum or molybdenum-based material. Wires 30 can have a generally uniform diameter (D) (relative to a wire length) ranging from 0.010 in (0.254 mm) to 0.050 in (1.27 mm), and more specifically, of about 0.024 in (0.610 mm). In an alternative embodiment, wires 30 can be formed from a ceramic material, such as a silica based material, and can have a diameter (D) ranging from 0.150 in (3.81 mm) to 0.250 in (6.35 mm).

FIG. 2 shows a number of wires 30 inserted into plies 24 of preform 26, according to step 14. As shown, wires 30 can be straight, or can include curved regions. Further, wires 30 can be inserted into preform 26 at an angle between 0° (generally parallel with outer surface 32 of preform 26) and 90° (generally perpendicular to outer surface 32). The insertion angle of one or a group of wires 30 can depend the desired cooling channel angle and/or the specific type of CMC component 22. For example, it may be desirable with an airfoil structure to create a region of cooling channels (represented in FIG. 3 as 34) angled at about 5° to 25° relative to surface 32, and more specifically, at about 17°. Similarly, the selected diameter (D) of a wire or wires 30 can depend on the desired diameter of cooling channels 34. Wires 30 can also be spaced apart a distance (d) from adjacent wires 30 based upon a desired concentration of cooling channel concentration and/or structural requirements in a particular area of CMC component 22. Although not shown to scale in FIG. 2, distance (d) can range from 0.010 in (0.254 mm) to 0.050 in (1.27 mm), which can be roughly equal to diameter (D) of a wire 30. Other (greater or lesser) distances are contemplated herein.

As wires 30 are inserted into preform 26, they generally do not damage (e.g., puncture or break) tows 28, rather, tows 28 are pushed aside to accommodate wires 30. This is in contrast to conventional machining methods used to form cooling features which typically cause fiber damage. In some embodiments, wires 30 can be woven or otherwise incorporated into a ply or plies 24 during preforming, and these methods also avoid breakage of tows 28. As shown in FIG. 2, wires 30 extend completely through a thickness (T) of preform 26 (which can be an equivalent structure to a wall portion of the finished CMC component 22) such that portions of each wire 30 extend beyond the boundaries of preform 26. In an exemplary embodiment, thickness (T) can range from 0.040 in (1.016 mm) to 0.080 in (2.032 mm), but can be thicker or thinner in alternative embodiments depending on the particular CMC component. Wires 30 can also be sized to be flush with the boundaries of preform 26 when inserted, and some wires 30 may not fully extend through preform 26. Further, although FIG. 2 shows wires 30 with non-uniform geometries and insertion angles to better illustrate various embodiments, it should be understood that wires 30 can have one or a combination of uniform or non-uniform insertion angles, spacing between adjacent wires 30, wire diameters, wire geometries, and/or wire materials.

At step 16, preform 26 undergoes matrix formation and densification using a chemical vapor infiltration or deposition (CVI or CVD) process. During densification, plies 24 are infiltrated by reactant vapors, and a gaseous precursor deposits on tows 28, and may also deposit on wires 30. The matrix material can be a silicon carbide or other suitable ceramic material. Densification is carried out until the resulting CMC has reached the desired residual porosity.

After densification and at step 18, wires 30 are chemically removed/dissolved from the densified CMC structure using a process such as chemical etching. Component 22 can be fully or partially immersed in a bath containing an etchant solution suitable for the material of wires 30. For molybdenum wires 30, the etchant can be an acidic solution of 50% nitric acid and 5% sulfuric acid. For ceramic wires 30, the etchant can be an alkaline solution of 22.5 wt % potassium hydroxide. Other concentrations of nitric acid and/or sulfuric acid, or mass fractions of potassium hydroxide are contemplated herein. Other types of acidic and basic solutions, respectively, are also contemplated herein. Further parameters, such as process temperature and time will depend on a number of factors such as wire concentration and diameter and solution strength. Further, embodiments having exposed wire material on either side of the CMC structure (such as is depicted in FIG. 2) may require less time to dissolve the wires 30. Although wires 30 are dissolved at step 18, material properties (e.g., hardness) of the CMC material remains unaffected by the etching process. FIG. 3 shows the component of FIG. 2 after wires 30 have been removed. Cooling channels 34 (represented with broken lines) are positioned where corresponding wires 30 had been, and have the same dimensions (e.g., geometry and diameter) and relative spacing as wires 30.

At step 20, any desired post-processing steps can be performed. In some embodiments, such steps can include the application of one or more protective coatings, such an environmental and/or thermal barrier coatings. A bond coat can also be applied to facilitate bonding between the CMC and protective coating. Other protective coatings, especially those suitable for use in a gas turbine engine environment, are contemplated herein. Method 10 can include additional inter-step processes (not shown in FIG. 1). For example, component 22 might require machining and/or surface preparation/cleaning. Further, based on the particular insertion method used for wires 30, steps 12 and 14 can occur sequentially, as shown, or can overlap to some degree, especially if wires 30 are being woven into the ply structure.

In yet another alternative embodiment, a wire 30 can instead be formed having a larger diameter than those discussed above with respect to FIG. 2 such that it is rod-shaped, or can be formed as a planar, sheet-like structure in order to create larger cavities within a CMC component. Such rod-shaped or planar structure 30 can be used to create, for example, bowed or curved cooling cavities difficult to produce with traditional methods.

While the disclosed method has been described for use with fiber plies 24 as the preform structure, it should be understood that the method can also be used on three-dimensional fiber structures. Such three-dimensional structures can be formed from woven, braided, needled, or stitched fibers, loosely-associated chopped fibers, and chopped-fiber or continuous-strand mats, to name a few, non-limiting examples. Three-dimensional structures can further be formed by joining together a plurality of individual three-dimensional structures of any combination, or any combination of one, two, and three-dimensional fiber structures.

The disclosed method produces CMC components with enhanced thermal properties due to the creation of cooling channels. Unlike machining methods, the wires used to form the cooling channels do not damage or break the fibers of the preform structure. This, in part, allows for relatively closer spacing of wires/cooling channels because the fiber structure is not compromised, and is therefore strong enough for tighter channel packing. The wires also allow for the creation of curved channels ranging in degree from gently curved to tortuous paths. The CMC components are ideal for harsh operating environments like the hot section of a gas turbine engine, that routinely reach temperatures of 2500° F. (1371° C.). Other aerospace applications include exhaust systems, ducting, and external systems. The disclosed method can also be used to produce enhanced CMCs for maritime, power generation, and industrial applications.

Discussion of Possible Embodiments

The following are non-exclusive descriptions of possible embodiments of the present invention.

A method of forming a ceramic matrix composite component with cooling channels includes embedding a plurality of wires into a preform structure, densifying the preform structure with embedded wires, and removing the plurality of wires to create a plurality of corresponding channels within the densified structure.

The method of the preceding paragraph can optionally include, additionally and/or alternatively, any one or more of the following features, configurations and/or additional components:

In the above method, the preform structure can include a plurality of fiber plies formed from a ceramic material.

In any of the above methods, the embedding step can include inserting the plurality of wires into the preform structure.

In any of the above methods, at least one of the plurality of wires can be inserted at an angle ranging from 0° to 90° relative to an outer surface of the preform structure.

In any of the above methods, the at least one of the plurality of wires can be inserted at an angle ranging from 5° to 25° relative to the outer surface of the preform structure.

In any of the above methods, at least one of the plurality of wires can extend completely through a thickness of the preform structure.

In any of the above methods, a diameter of each of the plurality of wires can range from 0.010 in to 0.050 in.

In any of the above methods, at least one of the plurality of wires can be formed from molybdenum.

In any of the above methods, a diameter of each of the plurality of wires can range from 0.150 in to 0.250 in.

In any of the above methods, at least one of the plurality of wires can be formed from a ceramic material.

In any of the above methods, a distance between one of the plurality of wires and an adjacent one of the plurality of wires can range from 0.010 in to 0.050 in.

In any of the above methods, the densifying step can include forming a matrix surrounding the preform structure with embedded wires using a chemical vapor infiltration or chemical vapor deposition process.

In any of the above methods, the removing step can include a chemical etching process to dissolve the plurality of wires.

In any of the above methods, at least one of the plurality of channels can have a curved geometry.

A ceramic matrix composite component includes a wall having a thickness and a plurality of channels extending at least partially though the thickness of the wall. A diameter of at least one of the plurality of channels ranges from 0.010 in to 0.050 in, and one of the plurality of channels is spaced apart from an adjacent one of the plurality of channels by 0.010 in to 0.050 in.

The component of the preceding paragraph can optionally include, additionally and/or alternatively, any one or more of the following features, configurations and/or additional components:

In the above component, each of the plurality of channels can extend though the thickness of the wall.

In any of the above components, at least one of the plurality of channels can have a curved geometry.

In any of the above components, the plurality of channels can include at least one straight channel and at least one channel having a curved geometry.

In any of the above components, at least one of the plurality of channels is angled from 5° to 25° relative to an outer surface of the wall.

In any of the above components, the component can be suited for operating environments of up to 2500° F.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite component with cooling channels, the method comprising:
    embedding a plurality of molybdenum wires into a preform structure comprising a plurality of fiber plies and an outer surface, the embedding step comprising one of:
        inserting the plurality of molybdenum wires into the preform structure such that the wires push aside fibers of the plies; and
        weaving the plurality of molybdenum wires into the preform structure;
        wherein at least a subset of the plurality of embedded molybdenum wires are embedded, with respect to the outer surface of the preform structure, at an angle ranging from 5° to 25°;
    densifying the preform structure with the plurality embedded molybdenum wires; and
    removing the plurality of molybdenum wires using a chemical etchant comprising nitric acid and sulfuric acid to create a plurality of corresponding channels within the densified preform structure.

2. The method of claim 1, wherein the plurality of fiber plies is formed from a ceramic material.

3. The method of claim 1, wherein at least one of the plurality of molybdenum wires extends completely through a thickness of the preform structure.

4. The method of claim 1, wherein a diameter of each of the plurality of molybdenum wires ranges from 0.010 in to 0.050 in.

5. The method of claim 1, wherein a diameter of each of the plurality of molybdenum wires ranges from 0.150 in to 0.250 in.

6. The method of claim 1, wherein a distance between one of the plurality of molybdenum wires and an adjacent one of the plurality of molybdenum wires ranges from 0.010 in to 0.050 in.

7. The method of claim 1, wherein the densifying step comprises forming a matrix surrounding the preform structure with embedded molybdenum wires using a chemical vapor infiltration or chemical vapor deposition process.

8. The method of claim 1, wherein the chemical etchant comprises a solution of 50% nitric acid and 5% sulfuric acid.

* * * * *